United States Patent [19]

Mori et al.

[11] Patent Number: 4,796,114
[45] Date of Patent: Jan. 3, 1989

[54] ROTARY HEAD ASSEMBLY WITH RIGID ADHESIVE BONDING POLE TIPS

[75] Inventors: Keiji Mori; Osami Ishii, both of Odawara, Japan

[73] Assignee: Fuji Photo Film Co., Ltd., Japan

[21] Appl. No.: 115,543

[22] Filed: Oct. 28, 1987

Related U.S. Application Data

[63] Continuation of Ser. No. 775,320, Sep. 11, 1985, abandoned.

[30] Foreign Application Priority Data

Oct. 2, 1984 [JP] Japan ............ 59-2066521

[51] Int. Cl.$^4$ ............................................. G11B 5/027
[52] U.S. Cl. ................................................ 360/84
[58] Field of Search ............ 360/84, 85, 95, 119–120, 360/110

[56] References Cited

U.S. PATENT DOCUMENTS

| | | | |
|---|---|---|---|
| 4,161,005 | 7/1979 | Kato et al. | 360/129 |
| 4,392,167 | 7/1983 | Joormann | 360/120 |
| 4,509,084 | 4/1985 | Fujioka et al. | 360/84 |
| 4,593,333 | 6/1986 | Yanagi | 360/126 X |

FOREIGN PATENT DOCUMENTS 0009108 1/1978 Japan ............................. 360/120

Primary Examiner—Stuart N. Hecker
Assistant Examiner—David J. Severin
Attorney, Agent, or Firm—Pasquale A. Razzano

[57] ABSTRACT

A rotary head assembly for use in a helical-scan magnetic recorder-reproducer includes a pair of magnetic head tips of single-crystal ferrite mounted on an axial end of a rotatable cylinder in substantially diametrically opposite relation to each other, each of the magnetic head tips having two tip members joined to each other through a mating interface and a surface for sliding contact with a magnetic tape. A body of a rigid adhesive is applied to an end of the mating interface remote from the surface. The rigid adhesive is highly rigid and substantially nonelastic for suppressing vibration. The rigid adhesive body attached to the magnetic head tip suppresses vibration of the magnetic head tip to reduce noise produced by the sliding contact between the magnetic head tip and the magnetic tape. The rigid adhesive body increases the rigidty of the magnetic head tip.

2 Claims, 1 Drawing Sheet

ROTARY HEAD ASSEMBLY WITH RIGID ADHESIVE BONDING POLE TIPS

This application is a continuation of application Ser. No. 775,320 filed Sept. 11, 1985, now abandoned.

BACKGROUND OF THE INVENTION

1. Field of the invention

The present invention relates to a rotary head assembly for use in a helical-scan magnetic recorder-reproducer, and more particularly to such a rotary head assembly composed of magnetic head tips of single-crystal ferrite mounted on a rotatable head drum or cylinder.

2. Description of the Prior Art

As is well known in the art, magnetic recorder-reproducers such as helical-scan video tape recorders employ a rotary head assembly comprising magnetic head tips mounted on a rotatable head drum or cylinder. The magnetic head tips of the recently available rotary head assemblies are generally formed of Mn-Zn-based single-crystal ferrite having excellent electromagnetic transduction characteristics.

It is known, however, that the magnetic head tips of single-crystal ferrite are liable to produce noise owing to the sliding contact of the magnetic head tips with a magnetic tape while the recorded signals are being reproduced from the magnetic tape. Although the cause of such noise has not yet been pinpointed, vibration and heat generated at the point where the magnetic head tips slidingly contact the magnetic tape are considered to be primarily responsible.

SUMMARY OF THE INVENTION

In view of the deficiency of the conventional rotary head assemblies, it is an object of the present invention to provide a rotary head assembly comprising magnetic head tips of single-crystal ferrite for use in a helical-scan magnetic recorder-reproducer, the rotary head assembly being designed for reducing noise arising from sliding contact between the magnetic head tips and a magnetic tape from which recorded signals are reproduced by the rotary head assembly.

According to the present invention, a rotary head assembly for use in a helical-scan magnetic recorder-reproducer includes a pair of magnetic head tips of single-crystal ferrite mounted on an axial end of a rotatable cylinder in substantially diametrically opposite relation to each other, each of the magnetic head tips having two tip members joined to each other through a mating interface and a surface for sliding contact with a magnetic tape. A body of a rigid adhesive is applied to an end of the mating interface remoter from the surface. The rigid adhesive which may comprise gypsum is highly rigid and substantially nonelastic for suppressing vibration. Therefore, the rigid adhesive body attached to the magnetic head tip is effective in suppressing vibration of the magnetic head tip to thereby reduce noise arising from sliding contact between the magnetic head tip and the magnetic tape. The rigid adhesive body also serves to increase the rigidity of the magnetic head tip.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

The term "magnetic recorder-reproducer" used herein is intended to mean magnetic tape recorders, magnetic tape recorder-reproducers, and magnetic tape reproducers, one example being a video tape recorder of the helical-scan type.

Figure 1:
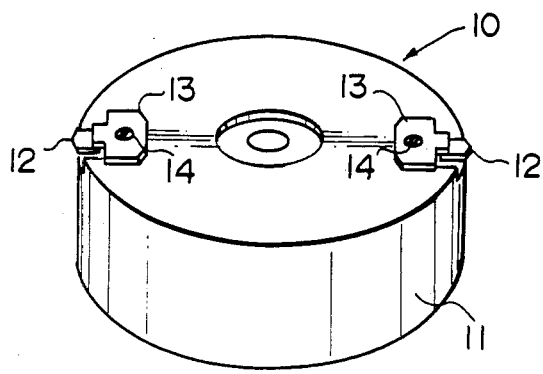
FIG. 1 is a perspective view of a rotary head assembly according to an embodiment of the present invention.
Figure 2:
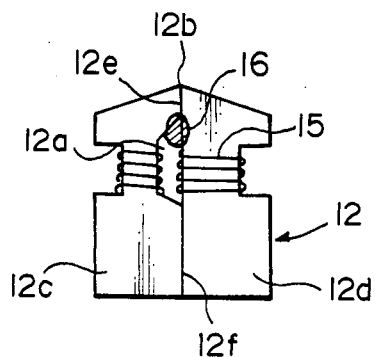
FIG. 2 is an enlarged plan view of a magnetic head tip of the rotary head assembly shown in FIG. 1.

As shown in FIGS. 1 and 2, a rotary head assembly 10 is composed of a cylindrical rotatable head drum or cylinder 11 and a pair of magnetic head tips 12, 12 mounted on one axial end surface of the head cylinder 11 in diametrically opposite relation to each other. Each of the magnetic head tips 12, 12 is made of single-crystal ferrite and comprises two tip members 12c, 12d joined to each other through first and second mating interfaces 12e, 12f. The magnetic head tip 12 has a substantially central coil window 12a defined in the tip member 12c. Coils 15 are wound around the tip members 12c, 12d through the coil window 12a.

The magnetic head tips 12, 12 are fixed respectively to tip bases 13, 13 fastened by respective screws 14, 14 to the axial end surface of the head cylinder 11. The magnetic head tip 12 has a surface 12b for sliding contact with a magnetic tape from which recorded signals can be reproduced by the rotary head assembly 10. A body 16 of a rigid adhesive is packed in the end of the coil window 12a closer to the sliding surface 12b and applied to the end of the first interface 12e remote from the sliding surface 12b, as shown in FIG. 2. The rigid adhesive used is gypsum. The rigid adhesive body 16 is applied after the magnetic head tip 12 has been manufactured. The rigid adhesive is highly rigid and substantially nonelastic to suppress vibration. As a consequence, the rigid adhesive body 12 applied to the magnetic head tip serves to suppress vibration of the magnetic tip head 12 for reducing noise arising from sliding contact between the same and the magnetic tape, and also serves to increase the rigidity of the magnetic head tip 12.

Figure 3:
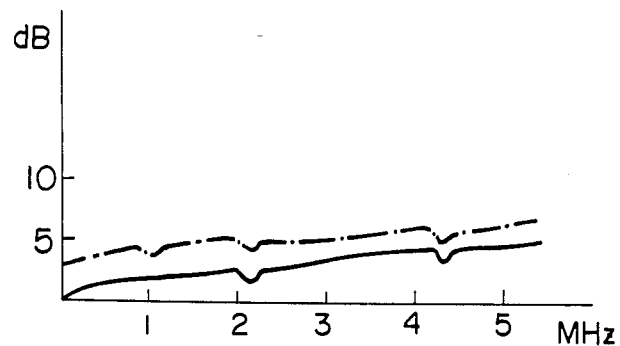
FIG. 3 is a graph showing the measured value of noise produced by the rotary head assembly and the measured value of noise produced by a conventional rotary head assembly for comparison.

As an example, the rigid adhesive body 16 was applied to magnetic head tips in a standard VHS video tape recorder (Type NV-3500N manufactured by Matsushita Electric Industrial Co., Ltd.) A standard video tape (Type T-120E manufactured by Fuji Photo Film Co., Ltd.) which was well demagnetized was loaded in the video tape recorder. The video tape recorder was operated in a playback mode, and noise arising from sliding contact between the magnetic head tips and the video tape was measured from the output signal of the playback preamplifier. The measured noise is indicated by the solid-line curve in FIG. 3. As a comparative example, the same measurement was carried out using ordinary magnetic head tips with no rigid adhesive body 16 in the same video tape recorder. The measured noise according to the comparative example is indicated by the broken-line curve in FIG. 3. In FIG. 3, amplifier-induced noise was removed from the measured noise.

Study of FIG. 3 clearly shows that the noise produced by the magnetic head tips 12 with the rigid adhesive bodies 16 applied thereto is about 1 to 2 dB lower than the noise generated by the magnetic head tips with no rigid adhesive body applied thereto.

With the arrangement of the present invention, therefore, noise induced by sliding contact with the magnetic head tips of single-crystal ferrite and the magnetic tape is easily and reliably reduced without involving any substantial compliation of the rotary head assembly.

Although a certain preferred embodiment has been shown and described, it should be understood that many changes and modifications may be made therein without departing from the scope of the appended claims.

We claim:

1. A rotary head assembly for use in a helical-scan magnetic recorder-reproducer, comprising:
   (i) a rotatable cylinder;
   (ii) a pair of magnetic head tips of single-crystal ferrite mounted on an axial end of said rotatable cylinder in substantially diametrically opposite relation to each other, each of said magnetic head tips having outer side surfaces, each of said magnetic head tips having two tip members joined to each other through a mating interface and a surface for sliding contact with a magnetic tape, and each said magnetic head tip having a substantially central coil window formed therein and including coils wound around said tip members through said coil windows;
   (iii) said mating interface joining the tip members including a first interface section between said surface and the central coil window and a second interface section on the opposite side of said window from said first section; and
   (iv) a body of rigid adhesive applied to an end of said first interface section remote from said sliding contact surface and being packed in an end of said coil window closer to said sliding contact surface; said adhesive also being applied to the outer side surfaces of the head tips to thereby suppress vibration of the tips and thereby reduce sliding noise.

2. A rotary head assembly according to claim 1, wherein said rigid adhesive comprises gypsum.

* * * * *